United States Patent [19]

Leiner

[11] Patent Number: 4,598,326

[45] Date of Patent: Jul. 1, 1986

[54] DIGITAL RECORDING APPARATUS WITH DISPARITY REDUCING ENCODER

[75] Inventor: Hans R. Leiner, Aurora, Colo.

[73] Assignee: Honeywell Inc., Minneapolis, Minn.

[21] Appl. No.: 542,943

[22] Filed: Oct. 18, 1983

[51] Int. Cl.[4] ............................. G11B 5/09; H03M 7/00

[52] U.S. Cl. ....................................... 360/40; 375/19; 340/347 DD

[58] Field of Search ...................... 360/40; 375/17–19; 371/55; 340/47 DD, 347 DD

[56] References Cited

U.S. PATENT DOCUMENTS

| | | | |
|---|---|---|---|
| 4,003,042 | 1/1977 | van Duuren | 340/347 DD |
| 4,216,460 | 8/1980 | Baldwin et al. | 340/347 DD |
| 4,310,860 | 1/1982 | Leiner | 360/40 |
| 4,348,659 | 9/1982 | Fugimori et al. | 340/347 DD |
| 4,358,852 | 11/1982 | Ichikawa | 360/40 X |
| 4,387,364 | 6/1983 | Shirota | 360/40 |
| 4,394,641 | 7/1983 | Ratigolas | 340/347 DD |
| 4,410,877 | 10/1983 | Carasso et al. | 360/40 |
| 4,496,934 | 1/1985 | Furukawa | 360/40 |
| 4,499,454 | 2/1985 | Shimada | 360/40 X |

OTHER PUBLICATIONS

IBM-TDB-DC Balanced Encoded Recording, vol. 18, No. 1, Jun. 1975, Furtneg et al.

*Primary Examiner*—Raymond F. Cardillo
*Assistant Examiner*—Alyssa H. Bowler
*Attorney, Agent, or Firm*—Charles L. Rubow

[57] ABSTRACT

Apparatus for use in recording digital words on magnetic tape without developing a net D.C. charge that would cause base line shift by use of a scheme of mapping of the words into code patterns from a larger number of bits and preselecting patterns which either have no D.C. weight or have a D.C. weight of ±4 or ±8 and in the latter two cases, providing alternate patterns for such words both with opposite sense to be used alternately to contract any charge buildup, the patterns also being selected to avoid frequency doubling.

14 Claims, 5 Drawing Figures

FIG. 1
| NO. | 4 BIT WORD | 8 BIT CODE PATTERN | D.C. WGT |
|---|---|---|---|
| 1a | 0000 | 10 | -4 |
| 1b | 0000 | 12 | +4 |
| 2a | 0001 | | -4 |
| 2b | 0001 | | +4 |
| 3a | 0010 | | -4 |
| 3b | 0010 | | +4 |
| 4 | 0011 | 22 | 0 |
| 5a | 0100 | | -4 |
| 5b | 0100 | | +4 |
| 6 | 0101 | 24 | 0 |
| 7 | 0110 | 26 | 0 |
| 8a | 0111 | X  40 | 0 |
| 8b | 0111 | X  42 | 0 |
| 9a | 1000 | 14  X | 0 |
| 9b | 1000 | 16  X | 0 |
| 9c | 1000 | 18  X | 0 |
| 9d | 1000 | 20  X | 0 |
| 10 | 1001 | 28 | 0 |
| 11 | 1010 | 30 | 0 |
| 12a | 1011 | X | 0 |
| 12b | 1011 | X | 0 |
| 13 | 1100 | 32 | 0 |
| 14a | 1101 | 34 | -8 |
| 14b | 1101 | 36 | +8 |
| 15a | 1110 | 44  X  X | 0 |
| 15b | 1110 | X  46  X | 0 |
| 15c | 1110 | X  48  X | 0 |
| 15d | 1110 | X  50  X | 0 |
| 16a | 1111 | | -4 |
| 16b | 1111 | | +4 |
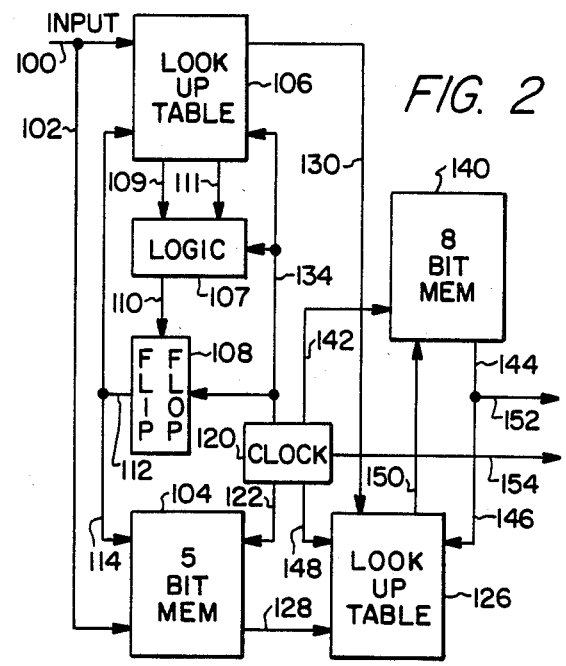
FIG. 2
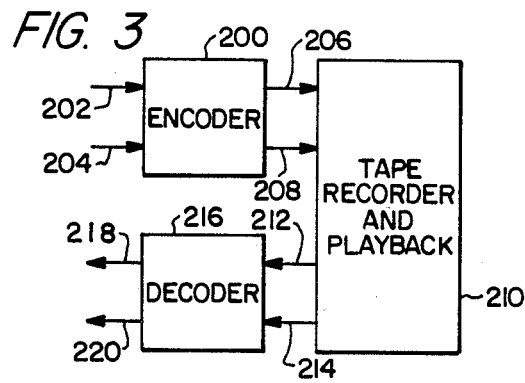
FIG. 3
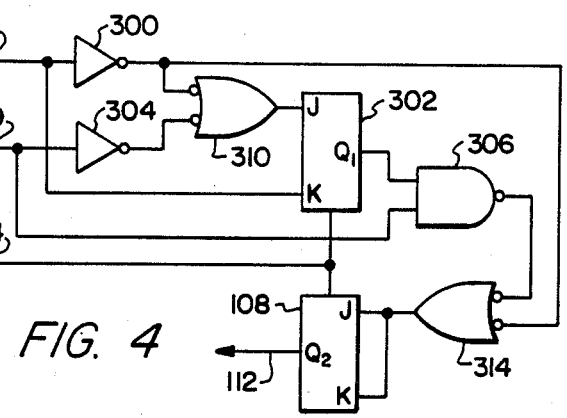
FIG. 4
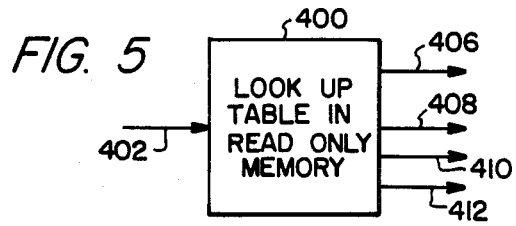
FIG. 5

DIGITAL RECORDING APPARATUS WITH DISPARITY REDUCING ENCODER

BACKGROUND OF THE INVENTION

In the art of recording, it is often desirable to use binary coded signals. This can present problems with recorders which have no DC response such as a video tape recorder using a rotating transformer to record signals and a magnetic tape moving adjacent thereto. It is customary to record using high frequency square waves and representing the binary numbers with wave shapes of different configurations. For example, a digital 10 is commonly represented by the four bit configuration 1010 and a digital two by 0010. Using high frequency square waves, these might be represented by:

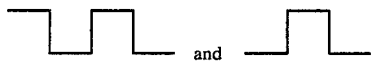

which would be transmitted through the rotating transformer and deposited as a series of magnetic positive and negative areas with, e.g., north being represented by a positive or "1" and south represented by a negative or "0". For convenience herein, the far left hand bit of a digital word or pattern will be referred to as the start, first, or beginning bit of the word or pattern and the far right hand bit will be referred to as the last or ending bit, and when there is a word or pattern on either side of the word or pattern under consideration, the right hand word will be referred to as the next word or pattern while the left hand word will be referred to as the previous word or pattern.

There are several problems associated with recording binary signals, a major one of which is referred to as base line shift. This occurs when a series of binary signals is transmitted which have, on the average, a greater number of positive or a greater number of negative bits. For example, a fourteen is 1110, a thirteen is a 1101, an eleven is 1011 and a seven is 0111. Each of these has a positive weighting factor of $+2$ since there are two more "1"'s than there are "0"'s. Thus, when a number of these are transmitted, the net increase in the positive signal would cause the base line to rise. Similarly, the number one is represented by 0001, two by 0010, four by 0100, and eight by 1000, all of which have a weighting factor of $-2$ and would cause the base line to drop. Furthermore, the number zero (0000) has a $-4$ weighting factor and fifteen (1111) has a $+4$ weighting factor. A series of these two numbers not only causes base line movement, but also conveys very little information to the clock regeneration circuit since there are no transitions from "0" to "1" or from "1" to "0" for that circuit to observe. Another problem is that an error in one bit will go unobserved because changing a "1" to a "0" or vice versa in any word results in another recognizable and valid word. For example, 1010 intended to represent ten but actually transmitted as 1110 would be read as a fourteen.

There have been suggestions in the prior art that some of these problems could be diminished if there were a greater number of code patterns to chose from. For example, a code identified as the "8-10" code has been used to increase the number of choices from $2^8=256$ to $2^{10}=1024$. Thus, out of the 1024 different patterns, 256 of them are selected to represent the desired 256 different combinations. By proper selection, the patterns will have little or no net D.C. content, that is the number of "1"'s and "0"'s will be the same, thus avoiding base line shift. The problem presented by the "8-10" code is that the transmission and reproduction apparatus must now be designed to accept a higher frequency, i.e., ten bits where there used to be eight.

Another code which has been proposed is referred to as the "8-16" code which greatly increases the number of patterns available and manages to do so without having to increase the frequency response of the equipment. Furthermore, there are enough choices available that it is possible to get 256 zero weight patterns that also leave at least 2 bits between any two successive transitions from "0" to "1" or from "1" to "0". Thus, since any transmission is composed entirely of 2 bit or greater pieces, the frequency is effectively half of a normal 16 bit transmission and accordingly, the electronics for an 8 bit system will not have to be changed.

Of course, 8, 10 and 16 bit systems require far more electronics memory and expense than the smaller 4 bit systems but any attempt to map a 4 bit system into a higher 6 or 8 bit system has been met with difficulty. For example, when an 8 bit system is used, there are just 256 patterns to choose from. Of these, only six can have both a zero D.C. component and 2 bit widths between transitions so as to avoid having to increase the frequency capability. These six are: 00001111, 00110011, 00111100, 11000011, 11001100 and 11110000. All other combinations either have more "0"'s than "1"'s or more "1"'s than "0"'s or involve a transition from one state ("0" or "1") to the other state ("1" or 37 0") after only 1 bit. For example, 11111100 and 00011000 each use at least 2 bits between transitions but the number of "1"'s is not equal to the number of "0"'s and base line shift could occur. Likewise, 10101100 and 01110010 have the same number of "1"'s and "0"'s, but have transitions only 1 bit wide and frequency doubling occurs.

The present invention overcomes these two problems and provides a 4 bit system that does not have base line shift, does not have frequency doubling, can detect all 1 bit errors in a recorded signal, is highly self synchronizing and provides frequent information for the clock regeneration circuit.

SUMMARY OF THE INVENTION

The present invention utilizes the mapping of a code having a smaller number of bits into a code having a larger number of bits and selecting from the larger number of patterns (1) those having no D.C. content and having no transitions less than 2 bits apart, (2) those having no transitions less than 2 bits apart but having a net positive D.C. component of a predetermined value along with those having a net negative D.C. component of the predetermined value and, (3) those having no D.C. content but having a one bit trasition only at the beginning or end of the pattern. Apparatus is provided with means to sense the D.C. component value and to select a pattern having the opposite D.C. component value the next time called for. The apparatus is also provided with means for determining the sense, i.e., positive or negative, of the first and the last bit of each pattern that has a one bit transition at the beginning or end and assuring that no pattern adjacent thereto starts or ends respectively in the opposite sense there assuring that at least two bits of the same sense exist between all transitions.

BRIEF DESCRIPTION OF THE DRAWINGS

FIG. 1 is a chart showing one possible set of code patterns used in the present invention to map four bit binary words into eight bit code patterns;

FIG. 2 is a block diagram of an encoding apparatus;

FIG. 3 is a block diagram of tape recorder/player utilizing the present invention;

FIG. 4 is a schematic diagram of a logic circuit used in the present invention; and FIG. 5 is a block diagram of a decoder apparatus.

DETAILED DESCRIPTION OF THE PREFERRED EMBODIMENT

In FIG. 1, the coding of the usual 16 combinations of "0"'s and "1"'s of 4 bit binary words into 8 bit patterns is shown. The first column has the arabic numerals 1-16 listed thereunder. In eight cases a particular numeral is represented twice with "a" and "b" subscripts and in two cases a numeral is represented four times with "a", "b", "c", and "d" subscripts. In all there are thirty representations for purposes to be explained in detail hereinafter.

In the second column of FIG. 1, adjacent the arabic numerals, the 4 bit binary code is shown with the usual 16 combinations of "0"'s and "1"'s. Note that where the arabic numerals are doubled or quadrupled, the same binary code is repeated.

In the third column of FIG. 1, adjacent the 4 bit binary code, preselected patterns from an eight bit code are shown. These patterns are shown in square wave signal form where low portions represent a "0" or negative value and the high portions represent a "1" or positive value. For example, the first pattern 10, in FIG. 1, is eight bits long and there are 4 low bits on the left end, 2 high bits to the right of middle and 2 low bits on the right end. This represent 00001100 in the eight bit code or − − − − + + − − in value. The second pattern 12, just below pattern 10 in FIG. 1 shows an opposite sense or mirror image of pattern 10. Thus, pattern 12 is 11110011 in the eight bit code or + + + + − − + + in value. Both patterns 10 and 12, however, represent the same 4 bit digital word, i.e., 0000. As another example, pattern 14 in FIG. 1 is 00011110 and represents the 4 bit word 1000. 1000 is also represented alternately by patterns 16 (00111001), 18 (11000110—the opposite of pattern 16) and 20 (11100001—the opposite of pattern 14). Patterns 22, 24, 26, 28, 30 and 32 have no alternate forms since, as will be explained, these patterns do not involve any problem of base line shift or frequency doubling. Patterns 34 and 36 are unusual since they consist of all "0"'s and all "1"'s respectively.

The fourth column of FIG. 1 is entitled "D.C. Weight" and shows the net D.C. component of the patterns in the third column. For example, as explained above, pattern 10 is 00001100 and thus has 6 "0"'s and 2 "1"'s for a net negative value of −6+2=−4. Pattern 12 is the opposite and has a D.C. weight of +6−2=+4. In similar fashion, pattern 14 (00011110) has a zero weight since the number of "0"'s and "1"'s are equal. Patterns 34 and 36 have a D.C. weight of −8 and +8 respectively.

It should be noted that within each grouping, shown by the brackets at the left side of FIG. 1, the sum of the D.C. weights is always zero. That is, each of the patterns representing a particular 4 bit word either has a zero D.C. weight or when added to the other alternate pattern produces a net D.C. weight of zero. This feature allows the 4 bit words to be translated without any overall build up of D.C. charge because alternate forms of such words having opposite D.C. weights are alternately used. Thus it is seen that instead of the 4 bit word 1111 being transmitted a number of times in succession and producing a +4 charge each time until a significant and base raising net charge occurs, the 8 bit word 00110000 (16a) is used giving a −4 charge then an alternate or "b" form of an 8 bit word, e.g., 11001111 (16b) or 00111111 (3b) having a +4 weight is used to bring the net charge back to zero. Even the worst case where the pattern 34 is used giving a −8 weight this charge can get no worse because the first time a non-zero weight word is called for, the "+" weight alternative will be used. For example, if pattern 34 representing 1101 was first called for, and 1101 was also the next weighted pattern called for, pattern 36 would be used with a +8 weight bringing the total back to zero. On the other hand, if after pattern 34 were called for, a 0000 code was needed, the "b" form of pattern 12 would be used with a +4 weight bringing the total to −4 and then the next non-zero weight called for would be a "b" pattern, e.g., 2b, 3b or 4b to bring the net back to zero.

While certain combinations of words could result in an oscillation between +4 and −4, or a repetition of 1101 could result in an oscillation between 0 and ±8, the total charge at any point along the recording will never exceed ±8. Thus when strings or chains of words are placed end to end along the tape recording, the net charge is kept low or is substantially zero so that no base line shift can occur.

Another major problem mentioned above is frequency doubling. The words being stored on the tape are actually 4 bit words and, without changing equipment or the characteristics of the electronics, the frequency that the equipment can handle is that produced by the alternating "0" to "1" for each bit of the 4 bit word. Alternating from "0" to "1" with only 1 bit between transitions in an 8 bit word would thus require twice the frequency response from the equipment. Accordingly, when selecting the patterns from the 256 arrangements available with an 8 bit code, those having at least 2 bits between adjacent transitions are chosen. Unfortunately, there are not enough choices so that a transition after a single bit is in all cases prevented. In FIG. 1, the patterns representing 8a-8b, 9a-9d, 12a-12b and 15a-15d all have a 1 bit transition situation at one or both of the ends of the patterns as indicated thereon by an "x". There are, however, no 1 bit transitions in the middle part of any patterns and so it becomes possible to arrange adjacent words so that the 1 bit at the beginning and/or end of a pattern is always made to be a "1" or a "0" so as to match the end of the previous word and/or the beginning of the following word and thus prevent another transition immediately after the end of the previous word and/or the beginning of the next.

For example, assume that a 0111 was called for in FIG. 1, the equipment has the option of choosing a pattern 40 or a pattern 42. By knowing the polarity ("0" or "1") at the end of the previous word the proper one may be chosen. If the end of the previous word was a "1" then pattern 42 would be chosen thus assuring that at least 2 bits of "1" would exist in the chain before the next transition. Likewise, if the previous word had ended in a "0", then pattern 40 would be chosen. In certain cases, when the end of an 8 bit pattern is a single bit, as with patterns 14, 16, 18 and 20, or where both ends are single bits, as with patterns 44, 46, 48 and 50, special care must be taken since the next word might also begin with a single bit which might seem to require that the equipment check the word after next which might also begin in a single bit requiring a look at the third next and so on. Such is not the case, however, because in each case where a pattern ends in a single bit, there are four patterns to choose from.

Thus, for example, if a 1000 were called for and the next word was also a 1000, look up table 106 will send an arbitrary signal to look up table 126 and look up table 126 will choose one of the four signals to send to 8 bit memory 140, say pattern 14. Now if the next word called for is another 1000 it will not matter what its following word starts with since either pattern 14 or pattern 16 may be used as the second. If, for example, the third word started low then the second word would be pattern 14 and if the third word started high, the second word would be pattern 16. Accordingly, at the time the equipment chose pattern 14 in the first place, it was only necessary to know the polarity of the first bit of the following word or the fact it is a word having four choices. Whatever the word turns out to be, there will be a form available to match the yet next word.

The same principle applies to patterns 44, 46, 48 and 50 where both ends have single bits. By knowing the polarity of the preceeding bit, say "1", the proper pattern to represent a 1110 can be chosen, e.g., if the next bit is a "0" then pattern 48. On the other hand, if the next word is again a 1110, then, as was the case above with pattern 1000, the first bit of the next word is not defined so the equipment will arbitrarily pick either 48 or 50. Then when the following bit is known, the equipment can again choose the right alternative.

Thus, it is seen that with 30 different code patterns chosen from 256 8 bit possibilitites, 16 4 bit words can be placed end to end on a recording medium such as magnetic tape without either base line shift or frequency doubling. The concept of having alternate code patterns and choosing the proper one for each situation provides this unique ability.

There are added advantages which are obtained by use of the present invention. For example, if a one bit error occurs, it will be immediately detected because it will change the D.C. weight value by 2. Thus, any 1 bit error will produce a change in weight factor of −2 or +2. If the proper code had a weight factor of 0, this will produce a weight factor of +2 or −2. If the proper code had a weight factor of ±4, the result of a 1 bit error will be ±6 or ±2 and if the proper code had a weight factor of ±8, then the 1 bit error will produce a weight factor of ±6. Since +2, −2, and +6, −6 cannot occur naturally, their existance with respect to any word indicates an error in that word Thus 100% of the 1 bit errors can be detected.

The system is also highly self synchronizing as can be seen if it were assumed that the synchronization slipped by, say, 1 bit form the proper position The equipment would very quickly start detecting a number of 1 bit errors becuase of the weight factors. Assume, for example, that pattern 24 (0101) was followed by pattern 18 (1000) and this by pattern 44 and finally by pattern 40, the resulting chain would properly be "——0,00110011, 11000110, 01100110, 01111000,0——". A synchronizing error causing everything to move to the right 1 bit would produce the following pattern "——,00011001, 11100011, 00110011, 00111100,00". The first group now has a weight factor of −2 indicating a 1 bit error, the second a +2 also indicating a 1 bit error, the third and forth are both zero and do not indicate a 1 bit error but, the existance of two consecutive errors and, over say a 20 word check, finding an additional few errors would indicate that a synchronism problem has occurred, not a 1 bit error problem. The equipment would then shift by one bit in a predetermined direction and check another 20 words to see if more errors were detected. If there were still several errors, another shift by one bit and another check would be performed. This would be repeated until there were no errors over the 20 word sample at which time synchronism would be restored.

Accordingly, the advantages of using alternate codes for various words has been shown. The same principals apply going from 2 bit words to 4 bit combinations or from 8 bit words to 16 bit combinations as described above although in the latter case the problem of base line shift and frequency doubling can be avoided by choosing proper patterns from the greatly increased number available.

FIG. 2 shows a block diagram for a unique encoder using the present inventive code mapping scheme. In FIG. 2 an input 100 is shown which, it will be assumed, comprises 4 lines each carrying a "1" or a "0" and together representing a 4 bit word. Input 100 is joined to a 4 line connection 102 which presents the 4 bit word for temporary storage in a 5 bit memory block 104. Input 100 also presents the 4 bit word to a first look up table device 106. Look up table device 106 determines the kind of 8 bit word which will be used to represent the 4 bit word and, if that 8 bit word has any D.C. weight factor of "4", whether positive or negative, a "1" signal is presented from look up table device 106 to a logic circuit 107 and therefrom to a flip-flop 108 via lines 109 and 110 respectively. If the look up table 106 determines that the word has a weight factor of "8", whether positive or negative, a "1" signal is presented to logic circuit 107 via a line 111. Logic circuit 107 will be explained in detail below.

Upon receipt of a "1" signal on line 110, flip-flop 108 changes state so that a "1" or a "0" is presented at output 112 to replace the "0" or "1" previously there. This signal is presented to the 5 bit memory 104 by a line 114 where it is stored along with the 4 bit word in 5 bit memory 104. An exception to this occurs when a word having a D.C. weight factor of "8" occurs and special considerations are then given as will be explained below. For the present it will be assumed that only words having ±4 weight factors are encountered.

The 5 bits in memory 104 consist of the 4 bit word and a "1" or a "0" from flip-flop 108 which indicates whether an "a" form or a "b" form of the word is desired. It will be assumed that a "1" indicates that an "a" form of an 8 bit word is to be used and a "0" indicates that a "b" form is to be used. The 5 bits in memory 104 are transferred, after a predetermined period, determined by a clock 120 sending a timing signal to memory 104 via a line 122, to a second look up table 126 via a 5 bit connection 128. The time period from clock 120 to 5 bit memory 104 is determined by the time required for look up table 106 to determine a weight factor and to set flip-flop 108 to provide the extra bit input to memory 104.

Look up table 126 chooses the proper form the 8 bit pattern will take not only by knowing the 8 bit word and the "a" or "b" configuration, but also by knowing whether the next word in line starts with a "1" or "0" and whether the previous word in line ended with a "1" or "0". The information about the next word is transmitted by look up table 106 via a line 130. A "1" will be presented on line 130 if the next word coming up starts with a "1". Because of the delay in the holding of the 4 bit word in memory 104, the look up table 106 has time to check the first bit of the next word and, at a time determined by clock 120 connected to look up table 106 by a line 134 (also connected to logic circuit 107 and flip-flop 108), to transmit the appropriate signal to look up table 126. Meanwhile, an 8 bit memory 140 containing the previous word in the chain produces an output, after a time period determined by clock 120 connected thereto by a line 142, on an 8 line connection 144. The last line of this group, containing the last bit of the previous word is connected to look up table 126 by a line 146 so that look up table 126 knows whether or not the last bit of the previous word was a "1" or "0".

Now, having the 4 bit word and the "a" or "b" state desired from memory 104, having the polarity of the last bit of the previous word from memory 140 and having the polarity of the first bit of the next word from look up table 106, look up table 126 chooses the proper code pattern, (i.e., those seen in the chart shown in FIG. 1) and after a time determined by clock 120, connected to the look up table 126 by a line 148, sends the chosen 8 bit signal pattern to the 8 bit memory 140 via an 8 line connection 150. Memory 140 stores the signal for release to an output 152 when called for by clock 120. Clock 120 also produces an output at 154 for use by the recorder system.

As described, whenever a word having a D.C. component of "4" occurs, a "1" will appear on line 110 to set flip-flop 108 to its other state. If the word has no D.C. component, flip-flop 108 will remain in whatever state it presently has. Thus, if the first word had a "4" D.C. weight, flip-flop 108 would receive a "1" from look up table 106 and, because of the "1" state, look up table 126 would select the "a" form of the word. There would then be a negative 4 charge in the system. Because flip flop 108 has now changed state, the next time a word having a D.C. weight of 4 is encountered it will cause the "b" form to be selected. This occurs because, as the next word that has a D.C. weight of "4" comes up, the "1" on line 110 will set flip-flop 108 in the opposite state and a "0" will accompany the word through memory 104 to look up table 126. Accordingly, table 126 will then produce the "b" form of the word and the overall charge drops back to zero.

When a word having a D.C. charge of +8 or −8 occurs, a "1" signal will be presented to logic circuit 107 via line 111. The operation of logic circuit 107 will be explained in connection with FIG. 4, but in FIG. 2 the existance of a "1" on line 111 causes logic circuit 107 to first operate to produce a "1" on line 110 just as occurred above. Now, however, the effect is some what different. If there had been a zero charge in the system, the use of curve 14a from FIG. 1 will leave a −8 charge in the system. This in and of itself is is not so bad but when this followed by a word having a D.C. value of 4, the "b" form will only cancel half of the charge bringing it to −4 and would, except for the operation of logic circuit 12 allow the next D.C. weighted word to produce another "a" form of the next D.C. weighted word. Now, if that happened to be another word with a D.C. weight of 8, the net system charge would change to −12. If this continued, it would produce the undesired base line shift.

As will be explained below, logic circuit 107 operates to prevent this by preventing a "1" signal from appearing on line 110, only after a word having an "8" weight is followed by a word having a "4" weight. Thus, the next word after an "8", having a D.C. weight of "4" will not cause a "1" to appear on line 110 and so flip-flop 108 will not change state. Accordingly, in the example above, when the first word having a D.C. weight of 8 causes an "a" form (i.e., pattern 34 in FIG. 1) to be produced and a −8 charge exists in the system, the next word, having a "4" weight will cause the "b" form to be used bringing the system charge to −4. Now, however, flip-flop 108 does not undergo a state change and accordingly the next word having a D.C. weight will again take the "b" form to either raise the system charge to zero or to +4. After this, flip-flop 108 is again state changed so that the following weighted word will take the "a" form again. While the system could go back and forth from −4 to +4 without ever going to zero, the average is substantially zero and base line shift will not occur.

FIG. 3 shows the encoder of FIG. 2 as a box 200 receiving the data input of 4 bit words on line 202 which may be the same as line 100 in FIG. 2 and a clock input on a line 204 which may be the same as the clock 120 and lines 122, 134, 142 and 148 of FIG. 2. The output of encoder 200 includes an 8 line connection 206 for data and a clock output 208. These may be the same as outputs 152 and 154 of FIG. 2. Outputs 206 and 208 provide inputs to a standard tape recorder and play back equipment shown in FIG. 3 as box 210. Box 210 is shown having a data output 212 and a clock output 214 and, in the play back mode, these lines will have signals thereon like those at the outputs of encoder 200. A decoder 216 receives these outputs and in a manner described in connection with FIG. 5 returns the 8 bit coded signals to their 4 bit form and produces this data output on a line 218 which along with a clock output 220 is presented to utilization apparatus (not shown).

Referring now to FIG. 4, a schematic diagram of the logic circuit of box 107 in FIG. 2 is shown. In FIG. 4, a first input 111, which corresponds to line 111 in FIG. 2, is shown connected to an inverter 300 and also to the K input of a flip-flop 302. A second input terminal 109, which corresponds to line 109 in FIG. 2, is shown connected to a second inverter 304 and also to the lower input of AND gate 306. The output of inverter 300 is shown connected to the upper inverting input terminal of an OR gate 310 and also to lower inverting input terminal of an OR gate 314. The output of inverter 304 is shown connected to the lower inverting input of OR gate 310. The output of OR gate 310 is shown connected to the J input terminal of a flip-flop 302. A third input terminal 134, which may be the same as line 134 from clock 120 in FIG. 2, is shown connected to the flip-flop 302 and also to flip-flop 108 which is the same as flip-flop 108 in FIG. 2. The Q1 output of flip-flop 302 is connected to the upper input terminal of the AND gate 306. AND gate 306 has an inverting output which is connected to the upper inverting input terminal of OR gate 314. The output of OR gate 314 is connectd to the J and K terminals of flip-flop 108 and the Q2 output of flip-flop 108 is shown on line 112, which may be the same as line 112 in FIG. 2.

To explain the operation of FIG. 4, it should be recalled that each time a word having a weight of "4" appears on line 109 it is desirable that flip-flop 108 change state and each time a word having a weight "8" appears on line 11 it is desirable that flip-flop 108 change state. It is only in the event that a word having a weight of "8" appearing on line 111 is followed by a word having a weight of "4" on line 109 that the operation of flip-flop 108 should be inhibited so as to prevent the problem of base line shift as described above.

In FIG. 4, let it be assumed that a series of words, each having the weight of "4", follow each other. In this event terminal 109 will receive a series of "1" or high signals while terminal 111 will remain at "0" or low. With terminal 111 being low, the output of inverter 300 will be a "1" so that the upper input to OR gate 310 and the lower input to OR gate 314 will be a "0". A "1" appearing on terminal 109 will emerge from inverter 304 as a "0" and thus the lower input of OR gate 310 will be a "1". Thus the output of OR gate 310 connected to the J input of flip-flop 302 will be "1" while the K input of flip-flop 302 will be "0". Flip-flops 302 and 108 are both controlled by the following characteristics: If the J and K inputs are both "0", the Q output will be held at its present state. If the J input is "0" and the K input is "1", the Q output will be set to "0" as soon as a clock signal from terminal 134 activates it. If the J terminal is "1" and the K terminal is "0" the Q output will be set to "1" as soon as the clock input from terminal 134 activates it. If both the J and K terminals are "1" then the flip-flops will be set to "toggle" or assume the opposite state as soon as the signal from the clock terminal 134 has activated it.

Accordingly, when the J terminal receives a "1" while the K terminal receives a "0" as in the presently assumed situation, the Q1 output from flip-flop 302 will be set to "1" so that AND gate 306 receives a "1" at its upper terminal. Since the lower terminal of AND gate 306 is connected to terinal 109 it also receives a "1" and accordingly the inverting output of AND gate 306 is a "0" and the upper inverting terminal of OR gate 314 provides OR gate 314 with a "1". In this event, flip-flop 108 receiving a "1" at both its J and K terminals will toggle to assume the opposite state of whatever it was in before. This procedure will be repeated every time a word having a weight of "4" produces a "1" on terminal 109 and accordingly, as desired, flip-flop 108 will change state each time and thus maintain the system weight at substantially "0".

Assume now that a series of words having a weight of "8" produce a "1" signal on terminal 111 and a "0" signal on terminal 109. It is seen that the output of inverter 300 will become a "0" while the output of inverter 304 will become a "1". The upper input of OR gate 310 will therefore be a "1" while the lower input of OR gate 310 will be a "0" and the J input to flip-flop 302 will be a "1". Now, however, the K input of flip-flop 302 is a "1" and accordingly when the clock activates flip-flop 302 the Q1 output thereof will toggle to its opposite state. As will be recalled, this state was a "1" as long as words having a weight of "4" were appearing on terminal 109 and accordingly when this ceases and a word of weight "8" appears, the Q1 output of flip-flop 302 will become a "0" and AND gate 306 will have two "0" inputs. Accordingly, the inverting output of AND gate 306 will be a "0" and the two inputs to OR gate 314 will now both be "1" since the input terminals are inverting. Accordingly, the J and K terminals of flip-flop 108 will receive a "1" and flip-flop 108 will toggle. If the next word is also of weight "8", by the same procedure, both flip-flops 302 and 108 will toggle to their opposite states. Accordingly, the system will operate around "0" as is desired, but the Q1 output of flip-flop 302 will change from a "1" to a "0" on each consecutive word having an "8" weight. More specifically, in a series of "8" weighted words Q1 will have a "0" output after every odd number of "1" signals on terminal 111 and will have a "1" output after every even number of "1" signals on terminal 111.

Let it now be assumed that a single word having a weight of "8" causes a "1" signal to appear on terminal 111 and this is then followed by a word having a weight of "4" to produce a "1" signal on terminal 109. As explained above, the appearance of "1" for the first time on terminal 111 has the effect of producing a "0" output on the Q1 terminal of flip-flop 302 and changes the state of flip-flop 108. Now, if a "1" signal appears on terminal 109, AND gate 306 will have a "1" signal on its lower input terminal and a "0" signal on its upper input terminal so that its output becomes a "1" and the two inputs to the OR gate 314 are now "0". A "0" signal now appears on terminals J and K of flip-flop 108 and it does not toggle. As will be recalled, this is the desired state of affairs in order to prevent base line drift. After a brief time period determined by the clock input terminal on 134 the Q1 output of flip-flop 302 will change to a "1" because with a "1" on terminal 109 the output of OR gate 310 and thus the J input of flip-flop 302 will be a "1" while the K input of flip-flop 302 will be a "0" and, as described in the flip-flop characteristics above, this situation sets the Q1 output to a "1". Thereafter, the next time that a "1" appears on terminal 109 AND gate 306 will receive two "1" inputs so that its output again becomes "0" and the upper input of OR gate 314 becomes "1" causing flip-flop 108 to toggle.

It is therefore seen that with the logic circuit of FIG. 4 flip-flop 108 will toggle back and forth so as to select the "a" or "b" forms of the word to be coded as is desired.

Referring now to FIG. 5, a block diagram is shown for the decoding arrangement used in the present invention. In FIG. 5 the decoder is represented by block 400 and contains therein a look up table, which is of the same form as look up tables 106 and 126 in FIG. 2. An input 402 to box 400 represents the 8 bit coded words coming from the play back mechanism of the tape recorder as in FIG. 3 and look up table 400 operating in reverse (changing 8 bit words to 4 bit words) produces a 4 bit decoded word on a line 406. This signal will be sent to the utilization apparatus (not shown). Also shown emerging from look up table 400 are three lines 408, 410 and 412. Line 408 represents an output indicating whether or not a 1 bit error has occurred. It will be recalled that any time a weighted value is other than "0", "±4", it indicates that a 1 bit error has occurred. Accordingly, look up table 400 operates to analyze the weight values of the 8 bit words coming in on line 402 and to produce an output signal on line 408 indicating a 1 bit error when it occurs.

Line 410 will have a signal thereon whenever more than one 1 bit error occurs so as to indicate that there is possibly a synchronization error as explained above.

Finally, line 412 produces an output indicative of the actual weight of the 8 bit words being submitted through input 402. Thus the signals on line 412 will be either "0", +4 or −4 or +8 or −8 at all times so as to indicate that the system is operating satisfactorily. If errors occur in the system, not only will a signal appear on the 1 bit error line 408, but a signal indicating something has gone wrong will appear on line 412. Likewise, if several errors occur in a row so that an error signal appears on line 410 an error signal will also appear on line 412.

It is therefore seen that I have provided a unique encoding apparatus which operates to prevent base line shift and also prevents frequency doubling while providing many advantages not found in the prior art. I do not wish to be limited by the specific disclosures used in connection with the preferred embodiment, but wish only to be limited by the following claims.

I claim:

1. Apparatus for transcribing digital data wherein first digital words containing a first number of first and second polarity bits are assigned code patterns chosen from a plurality of second digital words containing a larger second number of first and second polarity bits and wherein at least some of the first digital words are assigned at least two alternative code patterns and none of the code patterns contain a single bit of a first polarity with bits of the second polarity on both sides thereof, comprising:

first means having an input for receiving the plurality of first digital words and operable to produce an output of second digital words corresponding to the assigned code patterns, and second means connected to the first means to test the second digital words and to cause an alternative code pattern for a word to appear in the output upon the occurrence of the existence of a single bit of the first polarity at the start of any particular second digital word followed by a bit of the second polarity, and preceded by a second digital word having a bit at the end thereof which is of the second polarity and the second means selects an alternative code pattern for the particular word so that it has a starting bit of the second polarity.

2. Apparatus for use in changing a plurality of 4 bit binary words into a plurality of 8 bit binary patterns according to a predetermined assignment arrangement which includes alternate 8 bit binary patterns for those patterns having an unequal number of "0"'s and "1"'s, the alternate patterns having the same inequality in "0"'s and "1"'s but in the opposite sense, and includes alternate 8 bit patterns for those patterns ending with a single bit of one sense, the alternate patterns having a first form starting with a bit of the one sense, and a second form starting with a bit of the opposite sense, comprising:

first means for receiving the 4 bit words, determining the assigned 8 bit binary pattern and producing a first output if the assigned 8 bit binary pattern has an unequal number of "0"'s and "1"'s and a second output indicative of the sense of the first bit of the next successive 8 bit binary pattern in the plurality; and second means for receiving the 4 bit words and connected to the first means to receive the first and second outputs, the second means operable to produce a third output representing the 8 bit binary pattern assigned to the 4 bit word and choosing the pattern and its alternate in accordance with the first and second outputs to hold the overall number of "0"'s and "1"'s in succssive words to substantial equality and to assure that at least 2 bits exist between transitions that change sense to avoid frequency increase.

3. Apparatus according to claim 2 including a bistable device connected to the first means and operable to produce a change of state signal upon the occurrence of the first output and said second means is connected to the bistable device to receive the change of state signal and to choose the 8 bit pattern and its alternate in accordance with the state of the bistable device.

4. Apparatus according to claim 3 further including a 5 bit memory having a first input connected to receive the 4 bit word, a second input connected to receive the change of state signal, the second means connected to the 5 bit memory to receive the 4 bit signal and the change of state signal a predetermined time period after the first means receives the 4 bit word during which predetermined time period the first means receives at least the first bit of the next successive 4 bit word and produces the second output in accordance therewith.

5. Apparatus according to claim 4 further including an 8 bit memory connected to receive the third output and to hold the 8 bit pattern, the present pattern, thereon for a second predetermined time period during which second predetermined time period the sense of the last bit of the previous 8 bit pattern, the previous pattern, is determined and produced as a fourth output and producing the third output in accordance therewith to prevent the occurrence of single bit transitions between the previous pattern and the present pattern.

6. Apparatus for use in transcribing a series of digital 4 bit words into a tape recorder comprising:

first means operable to receive the series of 4 bit words and to select 8 bit words to represent them, the 8 bit words being chosen from a predetermined group, some of which have a D.C. weight of +4, some of which have a D.C. weight of −4, some of which have a D.C. weight of +8 and some of which have a D.C. weight of −8; and second means operable to alternately select 8 bit words of D.C. weight of +4 and −4 so that the overall average from the words is substantially zero and to alternately select words of D.C. weight +8 and −8 except when a word having a D.C. weight of ±8 is followed by a word having a D.C. weight of ±4, in which event the second means interrupts such alternation after that word having the D.C. weight of ±4 and then resume alternating after the following word having any D.C. weight.

7. Apparatus according to claim 6 wherein the second means includes a flip flop that normally changes state upon the occurrence of a word having any D.C. weight and includes a logic circuit which detects the presence of a word having a D.C. weight of ±8 followed by a word having a D.C. weight of ±4 after which the logic circuit inhibits the flip flop for one state change.

8. Apparatus according to claim 6 further including third means to determine the D.C. weight of the first bit of the next word ahead in the series and the D.C. weight of the last bit of the previous word behind in the series and operates to cause the second means to select an 8 bit word that starts and ends with bits of D.C. weight such that in the series there will always be at least two bits of the same D.C. weight side by side.

9. Apparatus for transcribing digital data wherein first digital words containing a first number of "1" and "0" opposite sense bit are assigned code patterns chosen from a plurality of second digital words containing a larger second number of "1" and "0" opposite sense bits and wherein at least some of the first digital words are assigned at least two alternative code patterns and none of the code patterns contain a single bit of a first sense with bits of the opposite sense on both sides thereof, comprising:

first means having an input for receiving the plurality of first digital words and operable to produce an output of second digital words corresponding to the assigned code patterns, and second means connected to the first means to test the second digital words and to cause an alternative code pattern for a word to appear in the output upon the occurrence of the existence of a single bit of a first sense at the end of any particular second digital word preceded by a bit of opposite sense, followed by a second digital word having a bit at the start thereof which is of opposite sense and the second means selects an alternative code pattern for the particular word so that it has an ending bit of the opposite sense.

10. Apparatus for changing a series of 4 bit binary words into a series of 8 bit binary patterns according to a predetermined assignment arrangement so that no frequency increase occurs comprising:

first means for receiving the 4 bit words and producing a first output indicative of the sense of the first bit of the 8 bit binary patterns;

second means for receiving the 8 bit binary patterns and producing a second output indicative of the sense of the last bit thereof; and third means for receiving the 4 bit binary words and the first and second outputs and determining therefrom the form of the 8 bit binary patterns so that no two changes of sense can occur separated by a single bit, and producing a third output in accordance therewith.

11. Apparatus according to claim 10 wherein the first means comprises a first look up table to determine the form of the 8 bit binary patterns and produce the first output based thereon.

12. Apparatus according to claim 10 wherein the third means includes a memory to store the 4 bit binary words for a predetermined time which time is sufficient to allow the first means to produce the first output as an indication of the sense of the first bit of the next 8 bit binary patterns in the series.

13. Apparatus according to claim 10 wherein the third means includes a look up table which receives each 4 bit binary words in the series and determines the desired 8 bit binary patterns therefor, the first output being indicative of the sense of the first bit of the next in the series and the second output being indicative of the sense of the last bit of the previous 8 bit arrangement.

14. Apparatus according to claim 13 wherein the second means includes an 8 bit memory to receive the third output and store it temporarily for release as a resultant output.

* * * * *